(12) United States Patent
Jones (10) Patent No.: US 9,098,516 B2
(45) Date of Patent: Aug. 4, 2015

(54) MULTI-DIMENSIONAL FILE SYSTEM

(75) Inventor: John David Jones, Pittsburgh, PA (US)

(73) Assignee: DS Zodiac, Inc., Seattle, WA (US)

( * ) Notice: Subject to any disclaimer, the term of this patent is extended or adjusted under 35 U.S.C. 154(b) by 10 days.

(21) Appl. No.: 13/552,467

(22) Filed: Jul. 18, 2012

(65) Prior Publication Data

US 2014/0026103 A1 Jan. 23, 2014

(51) Int. Cl.
*G06F 17/30* (2006.01)
*G06F 3/0481* (2013.01)
*G06F 3/0482* (2013.01)

(52) U.S. Cl.
CPC ........ *G06F 17/30091* (2013.01); *G06F 3/0482* (2013.01); *G06F 3/04815* (2013.01); *G06F 3/04817* (2013.01); *G06F 17/30126* (2013.01)

(58) Field of Classification Search
USPC ......................................... 715/851, 848–850
See application file for complete search history.

(56) References Cited

U.S. PATENT DOCUMENTS

| | | | | |
|---|---|---|---|---|
| 5,312,478 A | * | 5/1994 | Reed et al. | 715/205 |
| 5,339,390 A | * | 8/1994 | Robertson et al. | 715/782 |
| 5,515,486 A | * | 5/1996 | Amro et al. | 715/848 |
| 5,546,529 A | * | 8/1996 | Bowers et al. | 715/848 |
| 5,555,354 A | * | 9/1996 | Strasnick et al. | 345/427 |
| 5,671,381 A | * | 9/1997 | Strasnick et al. | 715/848 |
| 5,678,015 A | * | 10/1997 | Goh | 715/782 |
| 5,754,809 A | * | 5/1998 | Gandre | 715/782 |
| 5,801,704 A | * | 9/1998 | Oohara et al. | 715/856 |
| 5,808,613 A | * | 9/1998 | Marrin et al. | 715/850 |
| 5,812,134 A | * | 9/1998 | Pooser et al. | 715/848 |
| 5,835,094 A | * | 11/1998 | Ermel et al. | 715/848 |
| 5,838,326 A | * | 11/1998 | Card et al. | 715/775 |
| 5,847,709 A | * | 12/1998 | Card et al. | 715/850 |
| 5,870,734 A | * | 2/1999 | Kao | 1/1 |
| 5,880,733 A | * | 3/1999 | Horvitz et al. | 715/850 |
| 5,943,679 A | * | 8/1999 | Niles et al. | 715/247 |
| 5,973,695 A | * | 10/1999 | Walsh et al. | 715/854 |
| 6,005,579 A | * | 12/1999 | Sugiyama et al. | 715/855 |
| 6,012,072 A | * | 1/2000 | Lucas et al. | 715/210 |
| 6,054,989 A | * | 4/2000 | Robertson et al. | 715/848 |
| 6,088,032 A | * | 7/2000 | Mackinlay | 715/848 |
| 6,121,969 A | * | 9/2000 | Jain et al. | 715/850 |
| 6,166,738 A | * | 12/2000 | Robertson et al. | 715/839 |
| 6,222,465 B1 | * | 4/2001 | Kumar et al. | 341/20 |
| 6,229,542 B1 | * | 5/2001 | Miller | 715/782 |
| 6,253,218 B1 | * | 6/2001 | Aoki et al. | 715/201 |

(Continued)

OTHER PUBLICATIONS

"3D File System Navigator for IRIX 4.0.1+," ® 1993-2007 SGI, <http://web.archive.org/web/20070409024417/http:/www.sgi.com/fun/freeware/3d_navigator.html>, [retrieved May 31, 2012], 1 page.

(Continued)

*Primary Examiner* — Steven B Theriault
(74) *Attorney, Agent, or Firm* — Betts, Patterson & Mines, P.S.

(57) ABSTRACT

Systems and methods for providing a multi-dimensional file system are provided. Instead of the limited parent-child relationships provided by traditional folder tree file systems, embodiments of the present disclosure may provide file system relationships in an arbitrary number of dimensions to provide greater flexibility in organizing files, navigating the file system, and/or launching executable instructions. A user may navigate among files by traversing links between neighboring files, and/or may access specific files by specifying a location of the specific file in the multi-dimensional space.

28 Claims, 10 Drawing Sheets

(56) References Cited

U.S. PATENT DOCUMENTS

| | | | |
|---|---|---|---|
| 6,285,366 B1* | 9/2001 | Ng et al. | 715/853 |
| 6,323,846 B1* | 11/2001 | Westerman et al. | 345/173 |
| 6,326,988 B1* | 12/2001 | Gould et al. | 715/850 |
| 6,373,488 B1* | 4/2002 | Gasper et al. | 345/427 |
| 6,404,443 B1* | 6/2002 | Westerman | 715/776 |
| 6,539,519 B1* | 3/2003 | Meeker | 716/102 |
| 6,556,225 B1* | 4/2003 | MacPhail | 715/848 |
| 6,604,144 B1* | 8/2003 | Anders | 709/231 |
| 6,621,509 B1* | 9/2003 | Eiref et al. | 715/836 |
| 6,647,534 B1* | 11/2003 | Graham | 715/205 |
| 6,774,914 B1* | 8/2004 | Benayoun | 345/650 |
| 6,798,429 B2* | 9/2004 | Bradski | 345/156 |
| 6,816,175 B1* | 11/2004 | Hamp et al. | 715/854 |
| 6,880,132 B2* | 4/2005 | Uemura | 715/848 |
| 6,888,536 B2* | 5/2005 | Westerman et al. | 345/173 |
| 6,918,087 B1* | 7/2005 | Gantt | 715/737 |
| 6,938,218 B1* | 8/2005 | Rosen | 715/850 |
| 6,976,228 B2* | 12/2005 | Bernhardson | 715/830 |
| 6,990,637 B2* | 1/2006 | Anthony et al. | 715/851 |
| 7,043,701 B2* | 5/2006 | Gordon | 715/848 |
| 7,085,772 B1* | 8/2006 | Sternemann | 1/1 |
| 7,107,549 B2* | 9/2006 | Deaton et al. | 715/836 |
| 7,117,453 B2* | 10/2006 | Drucker et al. | 715/833 |
| 7,119,819 B1* | 10/2006 | Robertson et al. | 715/782 |
| 7,126,579 B2* | 10/2006 | Ritter | 345/156 |
| 7,134,092 B2* | 11/2006 | Fung et al. | 715/779 |
| 7,134,095 B1* | 11/2006 | Smith et al. | 715/860 |
| 7,137,075 B2* | 11/2006 | Hoshino et al. | 715/848 |
| 7,142,210 B2* | 11/2006 | Schwuttke et al. | 345/440 |
| 7,146,576 B2* | 12/2006 | Chang et al. | 715/848 |
| 7,173,604 B2* | 2/2007 | Marvit et al. | 345/156 |
| 7,178,111 B2* | 2/2007 | Glein et al. | 715/848 |
| 7,194,527 B2* | 3/2007 | Drucker et al. | 709/220 |
| 7,215,323 B2* | 5/2007 | Gombert et al. | 345/157 |
| 7,216,305 B1* | 5/2007 | Jaeger | 715/849 |
| 7,249,327 B2* | 7/2007 | Nelson et al. | 715/782 |
| 7,292,243 B1* | 11/2007 | Burke | 345/440 |
| 7,340,678 B2* | 3/2008 | Chiu et al. | 715/734 |
| 7,383,497 B2* | 6/2008 | Glenner et al. | 715/231 |
| 7,392,488 B2* | 6/2008 | Card et al. | 715/853 |
| 7,404,151 B2* | 7/2008 | Borchardt et al. | 715/850 |
| 7,412,650 B2* | 8/2008 | Gallo | 715/700 |
| 7,417,680 B2* | 8/2008 | Aoki et al. | 348/333.05 |
| 7,433,179 B2* | 10/2008 | Hisano et al. | 361/679.27 |
| 7,433,885 B2* | 10/2008 | Jones | 1/1 |
| 7,446,784 B2 | 11/2008 | Crew et al. | |
| 7,456,823 B2* | 11/2008 | Poupyrev et al. | 345/173 |
| 7,468,742 B2* | 12/2008 | Ahn et al. | 348/207.99 |
| 7,480,873 B2* | 1/2009 | Kawahara | 715/848 |
| 7,509,321 B2* | 3/2009 | Wong et al. | 1/1 |
| 7,511,710 B2* | 3/2009 | Barrett | 345/419 |
| 7,606,819 B2* | 10/2009 | Audet et al. | 1/1 |
| 7,607,150 B1* | 10/2009 | Kobayashi et al. | 725/41 |
| 7,657,845 B2* | 2/2010 | Drucker et al. | 715/833 |
| 7,663,620 B2* | 2/2010 | Robertson et al. | 345/419 |
| 7,665,033 B2* | 2/2010 | Byrne et al. | 715/782 |
| 7,680,817 B2* | 3/2010 | Audet et al. | 707/999.102 |
| 7,683,883 B2* | 3/2010 | Touma et al. | 345/163 |
| 7,698,647 B2* | 4/2010 | Steeb et al. | 715/738 |
| 7,698,658 B2* | 4/2010 | Ohwa et al. | 715/835 |
| 7,710,423 B2* | 5/2010 | Drucker et al. | 345/474 |
| 7,716,256 B2* | 5/2010 | Endo et al. | 707/805 |
| 7,716,604 B2* | 5/2010 | Kataoka et al. | 715/835 |
| 7,719,523 B2* | 5/2010 | Hillis | 345/173 |
| 7,724,242 B2* | 5/2010 | Hillis et al. | 345/173 |
| 7,725,839 B2* | 5/2010 | Michaels | 715/836 |
| 7,728,821 B2* | 6/2010 | Hillis et al. | 345/173 |
| 7,730,423 B2* | 6/2010 | Graham | 715/828 |
| 7,761,813 B2* | 7/2010 | Kim et al. | 715/836 |
| 7,810,048 B2* | 10/2010 | Lee | 715/817 |
| 7,840,907 B2* | 11/2010 | Kikuchi et al. | 715/790 |
| 7,870,509 B2* | 1/2011 | Cao et al. | 715/853 |
| 7,880,726 B2* | 2/2011 | Nakadaira et al. | 345/173 |
| 7,907,124 B2* | 3/2011 | Hillis et al. | 345/173 |
| 7,917,869 B2* | 3/2011 | Anderson | 715/850 |
| 7,986,324 B2* | 7/2011 | Funaki et al. | 345/440 |
| 7,995,078 B2* | 8/2011 | Baar | 345/660 |
| 8,024,671 B2* | 9/2011 | Lee et al. | 715/848 |
| 8,046,714 B2* | 10/2011 | Yahiro et al. | 715/810 |
| 8,064,704 B2* | 11/2011 | Kim et al. | 382/190 |
| 8,069,404 B2* | 11/2011 | Audet | 715/203 |
| 8,072,439 B2* | 12/2011 | Hillis et al. | 345/173 |
| 8,078,966 B2* | 12/2011 | Audet | 715/273 |
| 8,103,963 B2* | 1/2012 | Ikeda et al. | 715/764 |
| 8,111,255 B2* | 2/2012 | Park | 345/419 |
| 8,117,563 B2* | 2/2012 | Ok et al. | 715/848 |
| 8,130,211 B2* | 3/2012 | Abernathy | 345/176 |
| 8,139,043 B2* | 3/2012 | Hillis | 345/173 |
| 8,151,185 B2* | 4/2012 | Audet | 715/237 |
| 8,188,985 B2* | 5/2012 | Hillis et al. | 345/173 |
| 8,230,358 B1* | 7/2012 | Chaudhri | 715/773 |
| 8,232,990 B2* | 7/2012 | King et al. | 345/419 |
| 8,259,163 B2* | 9/2012 | Bell | 348/51 |
| 8,269,739 B2* | 9/2012 | Hillis et al. | 345/173 |
| 8,291,049 B2* | 10/2012 | Roos | 709/219 |
| 8,335,784 B2* | 12/2012 | Gutt et al. | 707/722 |
| 8,395,660 B2* | 3/2013 | Quennesson | 348/51 |
| 8,434,027 B2* | 4/2013 | Jones | 715/848 |
| 8,527,890 B2* | 9/2013 | Harada | 715/764 |
| 8,788,962 B2* | 7/2014 | Waldeck | 715/781 |
| 8,793,619 B2* | 7/2014 | Roe et al. | 715/851 |
| 2001/0024195 A1* | 9/2001 | Hayakawa | 345/173 |
| 2002/0033849 A1* | 3/2002 | Loppini et al. | 345/848 |
| 2002/0070981 A1* | 6/2002 | Kida | 345/833 |
| 2002/0129246 A1* | 9/2002 | Blumenau et al. | 713/168 |
| 2002/0152222 A1* | 10/2002 | Holbrook | 707/104.1 |
| 2003/0063134 A1* | 4/2003 | Lord et al. | 345/853 |
| 2003/0085931 A1* | 5/2003 | Card et al. | 345/853 |
| 2003/0128242 A1* | 7/2003 | Gordon | 345/848 |
| 2003/0142094 A1* | 7/2003 | Zhang | 345/440 |
| 2003/0142136 A1* | 7/2003 | Carter et al. | 345/782 |
| 2003/0149939 A1* | 8/2003 | Hubel et al. | 715/526 |
| 2003/0164827 A1* | 9/2003 | Gottesman et al. | 345/419 |
| 2004/0027330 A1* | 2/2004 | Bradski | 345/158 |
| 2004/0125143 A1 | 7/2004 | Deaton et al. | |
| 2004/0143598 A1* | 7/2004 | Drucker et al. | 707/104.1 |
| 2004/0196267 A1* | 10/2004 | Kawai et al. | 345/173 |
| 2004/0257375 A1* | 12/2004 | Cowperthwaite | 345/582 |
| 2005/0028111 A1* | 2/2005 | Schrag et al. | 715/851 |
| 2005/0057530 A1* | 3/2005 | Hinckley et al. | 345/173 |
| 2005/0091596 A1* | 4/2005 | Anthony et al. | 715/712 |
| 2005/0131924 A1* | 6/2005 | Jones | 707/100 |
| 2005/0210410 A1* | 9/2005 | Ohwa et al. | 715/821 |
| 2005/0223341 A1* | 10/2005 | Repka | 715/851 |
| 2005/0223342 A1* | 10/2005 | Repka et al. | 715/851 |
| 2005/0289482 A1* | 12/2005 | Anthony et al. | 715/851 |
| 2006/0031874 A1* | 2/2006 | Ok et al. | 725/39 |
| 2006/0053371 A1* | 3/2006 | Anderson | 715/701 |
| 2006/0090022 A1* | 4/2006 | Flynn et al. | 710/105 |
| 2006/0092133 A1* | 5/2006 | Touma et al. | 345/158 |
| 2006/0161863 A1* | 7/2006 | Gallo | 715/810 |
| 2006/0212833 A1* | 9/2006 | Gallagher et al. | 715/848 |
| 2006/0259516 A1* | 11/2006 | Stakutis et al. | 707/200 |
| 2006/0262116 A1* | 11/2006 | Moshiri et al. | 345/419 |
| 2007/0061745 A1* | 3/2007 | Anthony et al. | 715/764 |
| 2007/0070066 A1* | 3/2007 | Bakhash | 345/419 |
| 2007/0091068 A1* | 4/2007 | Liberty | 345/157 |
| 2007/0113207 A1* | 5/2007 | Gritton | 715/863 |
| 2007/0247425 A1* | 10/2007 | Liberty et al. | 345/158 |
| 2007/0250793 A1* | 10/2007 | Miura et al. | 715/810 |
| 2007/0250794 A1* | 10/2007 | Miura et al. | 715/810 |
| 2007/0256054 A1* | 11/2007 | Byrne et al. | 717/113 |
| 2008/0001948 A1* | 1/2008 | Hirsch | 345/440 |
| 2008/0005702 A1* | 1/2008 | Skourup et al. | 715/848 |
| 2008/0016468 A1* | 1/2008 | Chambers et al. | 715/835 |
| 2008/0016471 A1* | 1/2008 | Park | 715/848 |
| 2008/0062126 A1* | 3/2008 | Algreatly | 345/157 |
| 2008/0062257 A1* | 3/2008 | Corson | 348/47 |
| 2008/0089587 A1* | 4/2008 | Kim et al. | 382/190 |
| 2008/0155171 A1* | 6/2008 | Jeong | 711/101 |
| 2008/0180406 A1* | 7/2008 | Han et al. | 345/173 |
| 2008/0204424 A1* | 8/2008 | Jin et al. | 345/173 |
| 2008/0235628 A1* | 9/2008 | Faught | 715/848 |
| 2008/0276201 A1* | 11/2008 | Risch et al. | 715/853 |

(56) References Cited

U.S. PATENT DOCUMENTS

| | | | |
|---|---|---|---|
| 2008/0307361 A1* | 12/2008 | Louch et al. | 715/835 |
| 2009/0021488 A1* | 1/2009 | Kali et al. | 345/173 |
| 2009/0063971 A1* | 3/2009 | White et al. | 715/716 |
| 2009/0077501 A1* | 3/2009 | Partridge et al. | 715/846 |
| 2009/0103780 A1* | 4/2009 | Nishihara et al. | 382/103 |
| 2009/0150832 A1* | 6/2009 | Keller et al. | 715/854 |
| 2009/0157692 A1* | 6/2009 | Reinhardt | 707/10 |
| 2009/0204920 A1* | 8/2009 | Beverley et al. | 715/768 |
| 2009/0204928 A1* | 8/2009 | Kallio et al. | 715/799 |
| 2009/0222420 A1* | 9/2009 | Hirata | 707/3 |
| 2009/0265669 A1* | 10/2009 | Kida et al. | 715/863 |
| 2009/0282369 A1* | 11/2009 | Jones | 715/848 |
| 2009/0303231 A1* | 12/2009 | Robinet et al. | 345/419 |
| 2009/0313267 A1* | 12/2009 | Girgensohn et al. | 707/100 |
| 2009/0313585 A1* | 12/2009 | Hellinger et al. | 715/850 |
| 2009/0327969 A1* | 12/2009 | Estrada | 715/848 |
| 2010/0013780 A1* | 1/2010 | Ikeda et al. | 345/173 |
| 2010/0050133 A1* | 2/2010 | Nishihara et al. | 715/863 |
| 2010/0083165 A1* | 4/2010 | Andrews et al. | 715/784 |
| 2010/0083173 A1* | 4/2010 | Germann et al. | 715/810 |
| 2010/0095206 A1* | 4/2010 | Kim | 715/702 |
| 2010/0122195 A1* | 5/2010 | Hwang | 715/769 |
| 2010/0214285 A1* | 8/2010 | Grim et al. | 345/419 |
| 2010/0251170 A1* | 9/2010 | Louch et al. | 715/810 |
| 2010/0315413 A1* | 12/2010 | Izadi et al. | 345/419 |
| 2010/0333017 A1* | 12/2010 | Ortiz | 715/800 |
| 2011/0041098 A1* | 2/2011 | Kajiya et al. | 715/849 |
| 2011/0074824 A1 | 3/2011 | Srinivasan et al. | |
| 2011/0093821 A1* | 4/2011 | Wigdor et al. | 715/863 |
| 2011/0148798 A1* | 6/2011 | Dahl | 345/173 |
| 2011/0173284 A1* | 7/2011 | Carro | 709/206 |
| 2011/0179368 A1* | 7/2011 | King et al. | 715/769 |
| 2011/0184964 A1* | 7/2011 | Li | 707/756 |
| 2011/0310005 A1* | 12/2011 | Chen et al. | 345/156 |
| 2012/0084694 A1* | 4/2012 | Sirpal et al. | 715/769 |
| 2012/0151416 A1* | 6/2012 | Bell et al. | 715/848 |
| 2012/0198388 A1* | 8/2012 | Santesteban | 715/849 |
| 2012/0209656 A1* | 8/2012 | Rojahn | 705/7.28 |
| 2013/0097563 A1* | 4/2013 | Pacheco Rodrigues Velho et al. | 715/850 |

OTHER PUBLICATIONS

International Search Report, PCT Application No. PCT/US2013/050629, Nov. 11, 2013, 5 pages.

* cited by examiner

MULTI-DIMENSIONAL FILE SYSTEM

BACKGROUND

Traditional file system layouts are limited in the number of organizations and layouts made available. What is desired are systems and methods that provide more flexibility and functionality than are traditionally provided by file systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of navigating a multi-dimensional file system is provided. The method comprises receiving a navigation command, wherein the navigation command includes at least one direction on a dimension; changing a viewer location to a new viewer location based on the navigation command; and performing processing based on the new viewer location.

In some embodiments, a computer-readable medium having computer-executable instructions stored thereon is provided. In response to execution by one or more processors of a computing device, the instructions cause the computing device to receive a navigation command, wherein the navigation command includes at least one direction on a dimension; change a viewer location to a new viewer location based on the navigation command; and perform processing based on the new viewer location.

In some embodiments, a computing device configured to provide a multi-dimensional file system is provided. The computing device comprises at least one processor and a computer-readable medium having computer-executable instructions stored thereon. The instructions, in response to execution by the at least one processor, cause the computing device to receive a navigation command, wherein the navigation command includes at least one direction on a dimension; change a viewer location to a new viewer location based on the navigation command; and perform processing based on the new viewer location.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
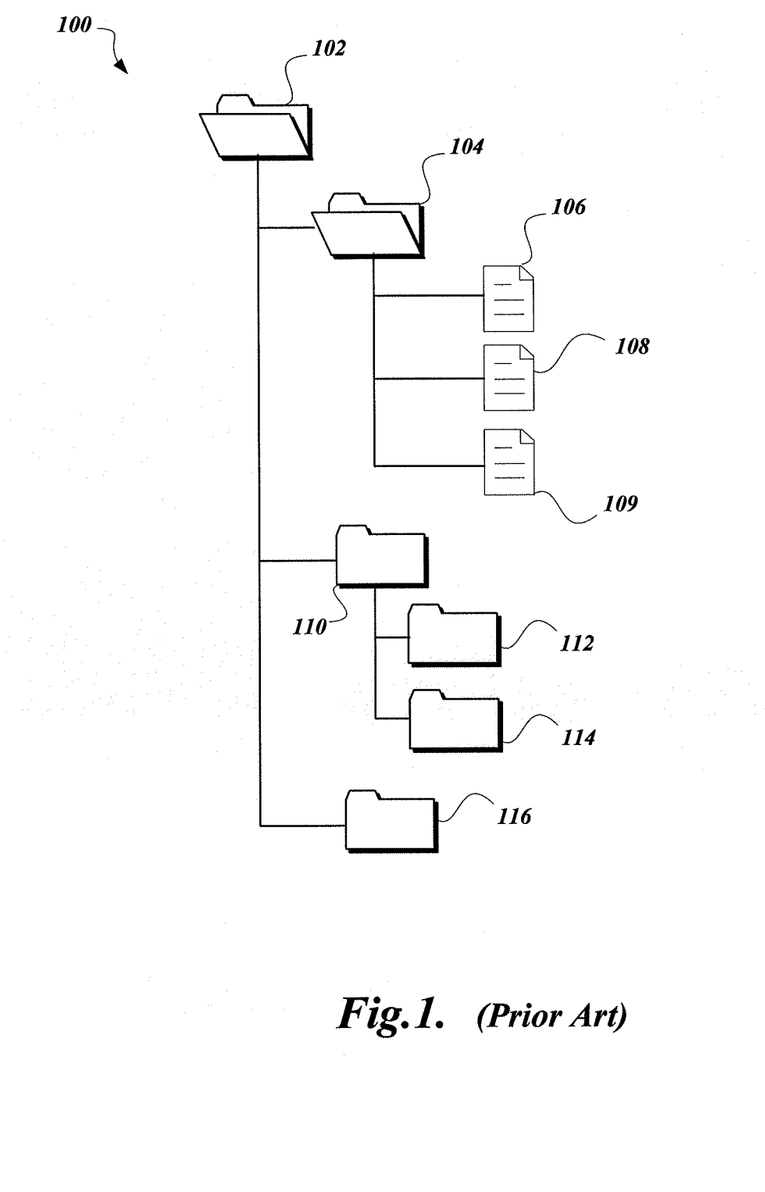
FIG. 1 is a schematic diagram that illustrates an example of how files are arranged in a traditional file system.

FIG. 1 is a schematic diagram that illustrates an example of how files are arranged in a traditional file system. As known to one of ordinary skill in the art, traditional file systems may include a folder tree 100, in which one or more files are organized into one or more folders. A root folder 102 is the logical starting point for the folder tree 100, and logically contains all other files and folders within it. A first subfolder 104, a second subfolder 110, and a third subfolder 116 may exist under the root folder 102 for further organization, and each of those subfolders may have further subfolders, such as the illustrated first child folder 112 and second child folder 114 illustrated under the second subfolder 110. The first subfolder 104 is illustrated as containing a first file 106, a second file 108, and a third file 109, though any of the other illustrated folders may also contain files. Each file may be referred to by a file name, in order to disambiguate the file from other files in the same folder. The files in the folder tree 100 hold data and executable instructions, while the folders in the folder tree 100 merely organize files.

The organization of files into folders in the traditional folder tree 100 is severely limiting. No further organization is made available by the file system beyond the file level, and navigation is limited to strict parent-child relationships between folders, and between files and their parent folder. What is desirable is a file system that allows greater flexibility in organization and a larger available namespace for organizing files. According to various aspects of the present disclosure, a multi-dimensional file system is provided. Instead of the limited parent-child relationships provided by the traditional folder tree 100, embodiments of the present disclosure may provide file system relationships in an arbitrary number of dimensions to provide greater flexibility in organizing files, navigating the file system, and, in some embodiments, launching executable instructions. In some embodiments, files in a multi-dimensional file system may be connected to one or more neighboring files. A user may navigate among files by traversing links between neighboring files, and/or may access a specific file by specifying a location of the specific file in the multi-dimensional space.

In some embodiments of the present disclosure, files may be organized in any number of dimensions. Each dimension extends conceptually in two opposing directions, starting from an origin point. To explain this concept, examples of a two-dimensional file system, a three-dimensional file system, and a four-dimensional file system will be illustrated and described. However, one of ordinary skill in the art will understand that the scope of the present disclosure is not limited to these embodiments, but instead includes file systems of greater numbers of dimensions than those explicitly described herein. Also, each dimension will be described in directional terms such as a north-south dimension, an east-west dimension, an up-down dimension, and/or the like. One of ordinary skill in the art will understand that these names are used for ease of discussion only, and that in other embodiments, different names may be used, or no names may be used and the dimensions may be referenced numerically.

The discussion below primarily refers to embodiments wherein each dimension is divided into integral numbers of locations. For example, on a north-south dimension, a file may be located at the origin, at one unit north of the origin, at two units north of the origin, and/or the like. However, in some embodiments, one or more dimensions may be further divisible into fractional locations. For example, on the north-south dimension, a file may be located at the origin, at a half-unit north of the origin, at a whole unit north of the origin, at one-and-a-half units from the origin, and so on.

Figure 2:
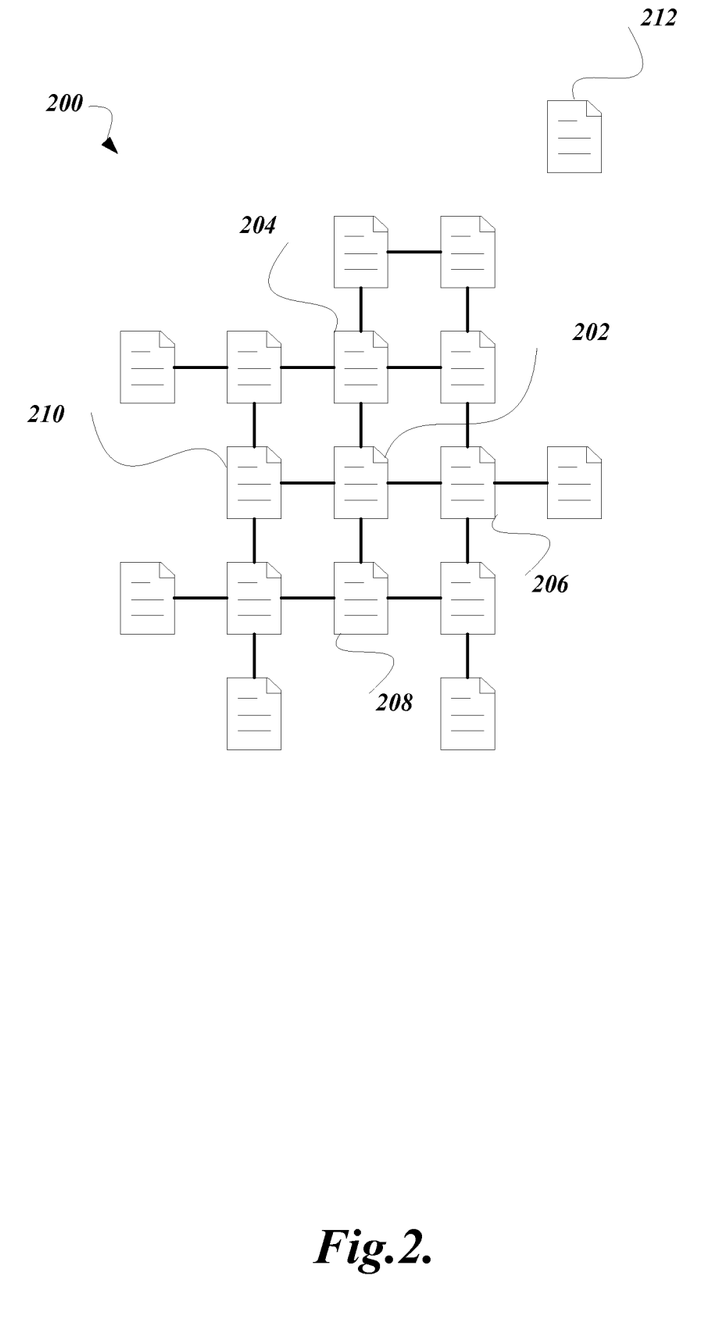
FIG. 2 is a schematic diagram that illustrates an exemplary embodiment of a file organization in a two-dimensional file system according to various aspects of the present disclosure.

FIG. 2 is a schematic diagram that illustrates an exemplary embodiment of a file organization in a two-dimensional file system according to various aspects of the present disclosure. In the illustrated two-dimensional file system 200, the files are arranged conceptually in a two-dimensional plane. An origin file 202 is situated at the center of the plane. Each file in the two-dimensional file system 200 may be logically connected to neighboring files in a north-south dimension and/or in an east-west dimension. For example, from the origin file 202, traveling north on the north-south dimension would take the user to a northern neighbor file 204, and traveling south on the north-south dimension would take the user to a southern neighbor file 208. Likewise, from the origin file 202, traveling east on the east-west dimension would take the user to an eastern neighbor file 206, and traveling west on the east-west dimension would take the user to a western neighbor file 210. In some embodiments, traversing a link between files may cause code associated with the link or with the destination file to be executed. This functionality will be discussed further below.

Figure 3:
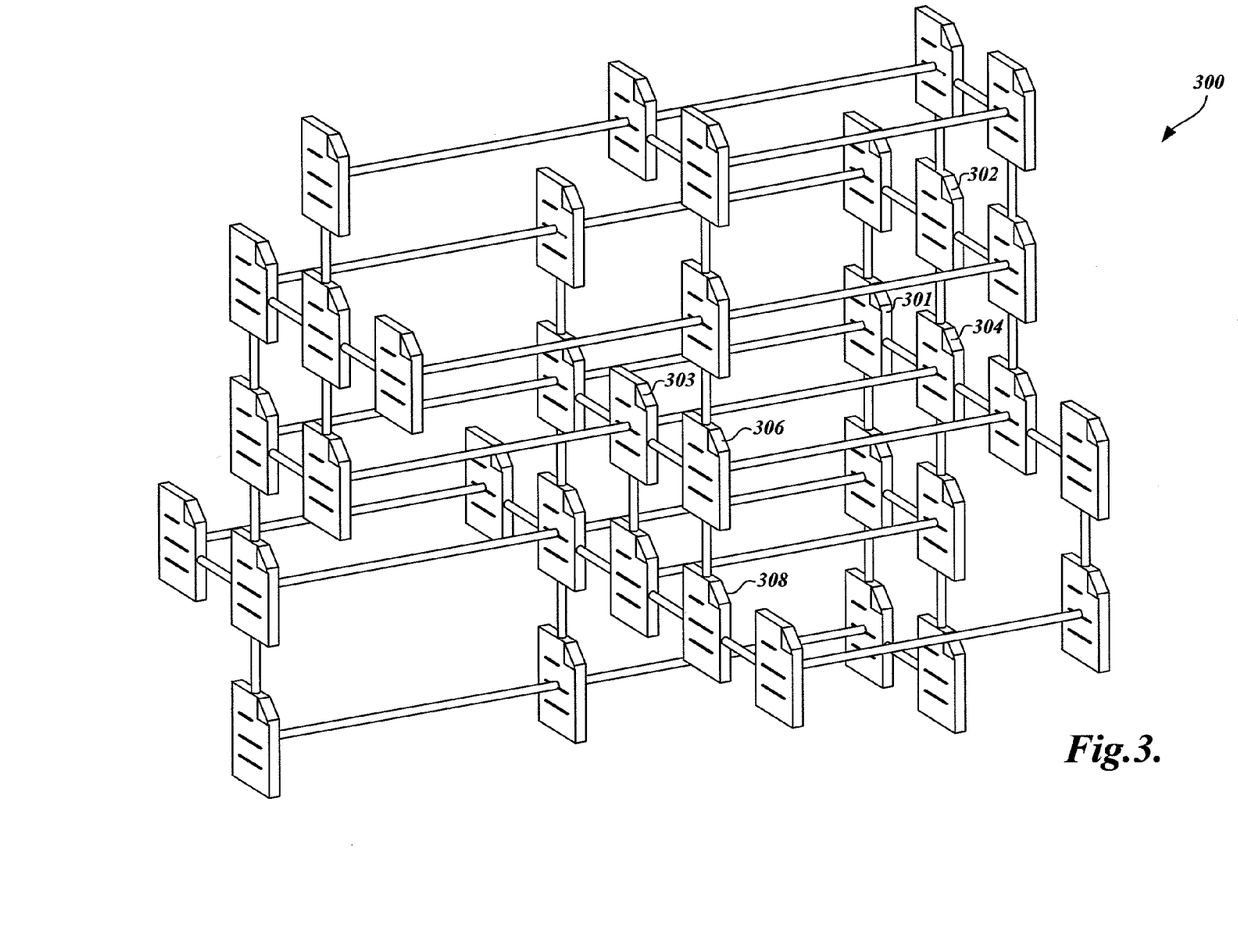
FIG. 3 is a schematic diagram that illustrates an exemplary embodiment of a file organization in a three-dimensional file system according to various aspects of the present disclosure.

In some embodiments, files in a multi-dimensional file system such as the two-dimensional file system 200 must be connected to a neighboring file to be accessible. However, in some embodiments, files may be unconnected to other files, and may be accessed by explicitly referring to their location instead of by navigating connections from other files. For example, in the illustrated two-dimensional file system 200, unconnected file 212 is not reachable by traversing links from the other files because it has no neighboring files. However, a user may be able to access the unconnected file 212 by referring to its location in the plane, three spaces north from the origin file 202 and two spaces east from the origin file 202. In the illustrated embodiment, each file is connected to each of its immediate neighbors. However, in some embodiments, a file may be an immediate neighbor of another file without being directly connected to the neighboring file. Also, in some embodiments, files may be connected to other files that are not FIG. 3 is a schematic diagram that illustrates an exemplary embodiment of a file organization in a three-dimensional file system according to various aspects of the present disclosure. The illustrated three-dimensional file system 300 builds on the concepts discussed above with respect to the two-dimensional file system 200, but now applied to three dimensions. As above, each file may have neighbors in a two-dimensional plane on a north-south dimension and an east-west dimension. In the three-dimensional file system 300, each file may also have additional neighbors in an up-down dimension. Another way to conceptualize the three-dimensional file system 300 is as multiple two-dimensional file systems stacked upon each other, which can be reached by travelling on an up-down dimension. For example, from a first file 304, a user may travel west to reach a western neighbor 301, south to reach a southern neighbor 303, or up to reach an upper neighbor 302. As another example, from a second file 306, the user may travel west to reach the aforementioned southern neighbor 303 of the first file 304, or down to reach a lower neighbor 308.

Figure 4:
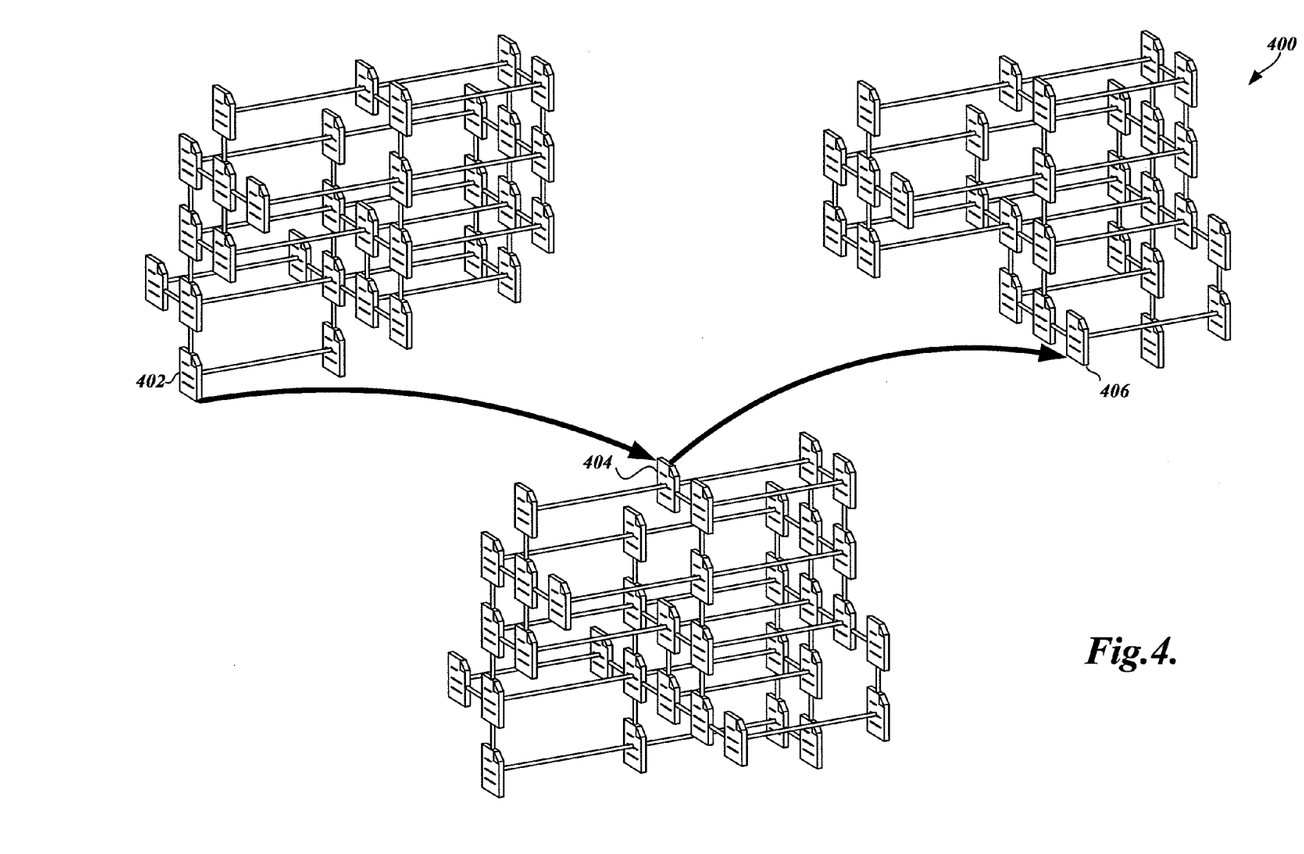
FIG. 4 is a schematic diagram that illustrates an exemplary embodiment of a file organization in a four-dimensional file system according to various aspects of the present disclosure.

FIG. 4 is a schematic diagram that illustrates an exemplary embodiment of a file organization in a four-dimensional file system according to various aspects of the present disclosure. The illustrated four-dimensional file system 400 builds on the concepts discussed above with respect to the two-dimensional file system 200 and the three-dimensional file system 300, but now applied to four dimensions. The four-dimensional file system 400 includes a north-south dimension, an east-west dimension, and an up-down dimension, as discussed above with respect to the three-dimensional file system 300. The four-dimensional file system 400 also includes an in-out dimension. This fourth dimension is hard to illustrate, but conceptually, one of ordinary skill in the art will understand that, from a first file 402, a user could travel "in" to an inner neighbor 404 which exists in a separate three-dimensional space, or could travel from file 404 "out" to an outer neighbor 406 which exists in yet another separate three-dimensional space, just as one could travel "up" into a separate two-dimensional space or "down" into a separate two-dimensional space in the three-dimensional file system 300.

Though two-, three-, and four-dimensional file systems are illustrated and described herein, one of ordinary skill in the art will understand that similar concepts could be applied to file systems having even more dimensions.

In some embodiments, a multi-dimensional file system may be implemented on top of a traditional file system, such that the files of the multi-dimensional file system are stored by the traditional file system but are accessible through an interface that presents the files as if stored by the multi-dimensional file system instead of the traditional file system. For example, in some embodiments, all of the files of the multi-dimensional file system may be stored in a single directory of the traditional file system. In some embodiments, the location of the files in the multi-dimensional file system may be stored in a location data store such as a database and/or the like which maps uniquely generated filenames in the traditional file system to locations in the multi-dimensional file system. In some embodiments, the location of the files in the multi-dimensional file system may be encoded in storage of the traditional file system, such as in a filename of each file.

Figure 5A:
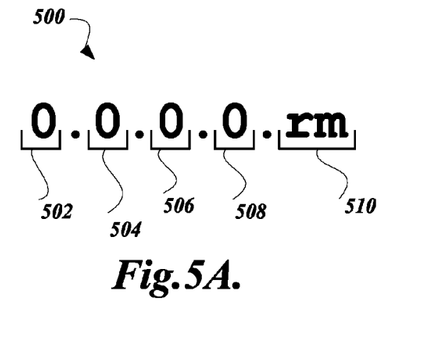
FIGS. 5A and 5B illustrate an exemplary embodiment of filenames in a traditional file system that may be used to encode two-dimensional file system information, according to various aspects of the present disclosure.
Figure 5B:
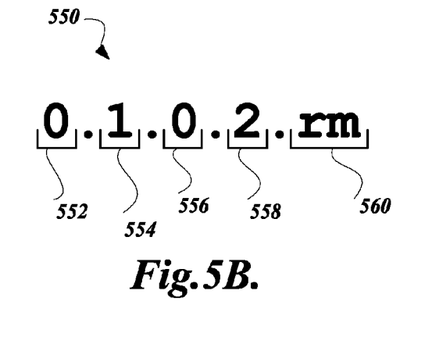

FIGS. 5A and 5B illustrate an exemplary embodiment of filenames in a traditional file system that may be used to encode two-dimensional file system information, according to various aspects of the present disclosure. FIG. 5A illustrates a filename 500 suitable for an origin file such as the origin file 202 illustrated in FIG. 2. The filename 500 includes a north location 502, an east location 504, a west location 506, and a south location 508. The filename 500 may also include a file type extension 510 that indicates that the file is for use with the multi-dimensional file system. The layout of the filename 500 is exemplary only, and in some embodiments, the order of the location elements may be changed.

Each location element, separated by period delimiters, indicates a distance from the origin location in the relevant direction. In the illustrated embodiment that includes one location element for each direction on each dimension, each location value may be greater than or equal to zero. For example, for locations that are south of the origin, the north location 502 will be zero and the south location 508 will be greater than or equal to one. Meanwhile, for locations that are north of the origin, the north location 502 will be greater than or equal to one, while the south location 508 will be zero. In some embodiments, a single location element may be provided for each dimension that may include both positive and negative values, instead of pairs of location elements. In the illustrated embodiment, positive base 10 numbers are used for each location element, but in other embodiments, other number bases and/or symbol sets may be used in location elements to represent distances from the origin location.

In FIG. 5A, the filename 500 represents the origin file, and so each location value is zero. FIG. 5B illustrates a filename 550 that represents a file away from the origin. A north location 552 is zero and a south location 558 is two, which indicates that the file is two units south of the origin file. An east location 554 is one and a west location 556 is zero, which indicates that the file is one unit east of the origin file. The file extension 560 again indicates that the file is for use with the multi-dimensional file system.

Figure 6:
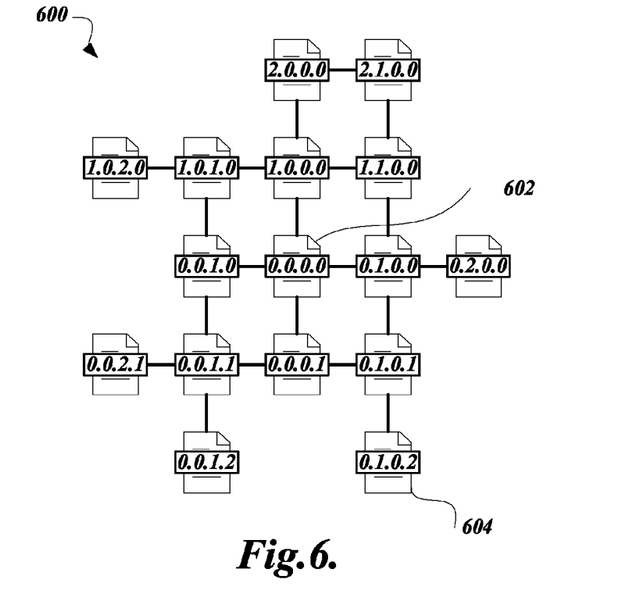
FIG. 6 illustrates an example of filenames such as those illustrated in FIGS. 5A and 5B, as applied to a two-dimensional file system similar to the one illustrated in FIG. 2.

FIG. 6 illustrates an example of filenames such as those illustrated in FIGS. 5A and 5B, as applied to a two-dimensional file system 600 similar to the one illustrated in FIG. 2. The file extensions do not appear in FIG. 6 for clarity. As examples, the filename 500 of FIG. 5A is applied to the origin file 602, and the filename 550 of FIG. 5B is applied to the file 604 that is one file east and two files south of the origin file 602. The rest of the files in the two-dimensional file system 600 are named according to the same scheme.

Figure 7:
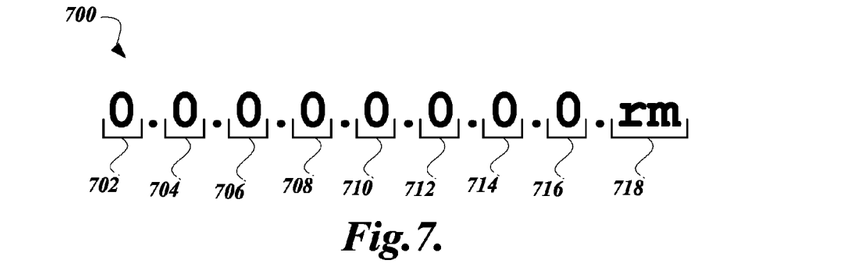
FIG. 7 illustrates a filename adapted for a four-dimensional file system, according to various aspects of the present disclosure.

While FIGS. 5A, 5B, and 6 relate to a two-dimensional file system, some embodiments of such a naming scheme may be extended to include additional dimensions. FIG. 7 illustrates a filename 700 adapted for a four-dimensional file system. A file extension 718 indicates that the file is usable with the multi-dimensional file system. A north location 702 and a south location 704 indicate a location on a north-south dimension. A west location 706 and an east location 708 indicate a location on an east-west dimension. An up location 710 and a down location 712 indicate a location on an up-down dimension. An in location 714 and an out location 716 indicate a location on an in-out dimension. One of ordinary skill in the art will recognize that this scheme may be extended arbitrarily to any number of dimensions.

Figure 8:
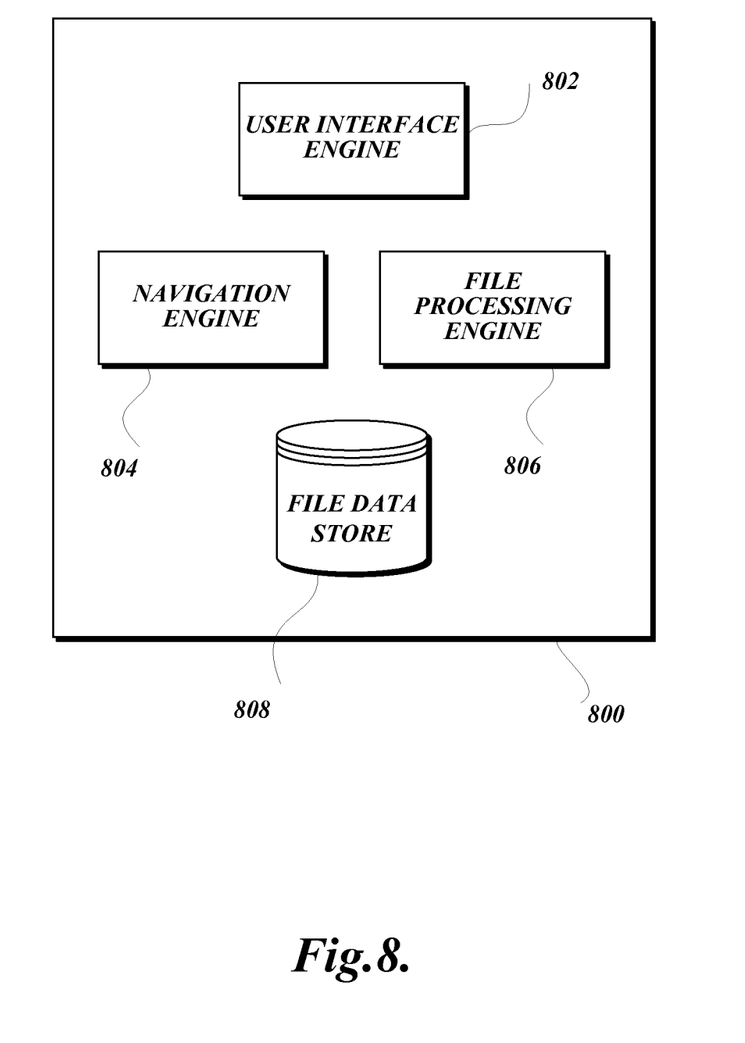
FIG. 8 is a block diagram that illustrates an exemplary embodiment of a computing device configured to provide a multi-dimensional file system according to various aspects of the present disclosure.

FIG. 8 is a block diagram that illustrates an exemplary embodiment of a computing device configured to provide a multi-dimensional file system according to various aspects of the present disclosure. As illustrated, the computing device 800 includes a user interface engine 802, a navigation engine 804, and a file processing engine 806.

In general, the word "engine" (used interchangeably with the word "application"), as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. An engine may be compiled into executable programs or written in interpreted programming languages. Software engines or applications may be callable from other engines or from themselves. Generally, the engines or applications described herein refer to logical modules that can be merged with other engines or applications, or can be divided into sub-engines. The engines or applications can be stored in any type of computer-readable medium or computer storage device and be stored on and executed by one or more general purpose computers, thus creating a special purpose computer configured to provide the engine or application.

In some embodiments, the user interface engine 802 is configured to present at least a current file (and/or a result of processing associated with a current file) to the user, and to receive movement commands input by the user. In some embodiments, the navigation engine 804 is configured to track a viewer location that indicates a current file within a multi-dimensional file system, and to change the viewer location based on the movement commands received by the user interface engine 802. In some embodiments, the file processing engine 806 is configured to perform processing based on a current file. The file processing engine 806 may also be configured to create new files when instructed to do so by the navigation engine 804.

As illustrated, the computing device 800 also includes a file data store 808. As understood by one of ordinary skill in the art, a "data store" as described herein may be any suitable device configured to store data for access by a computing device. One example of a data store is a traditional file system stored on a computer-readable storage medium. Another example of a data store is a highly reliable, high-speed relational database management system (DBMS) executing on one or more computing devices and accessible over a high-speed packet switched network. However, any other suitable storage technique and/or device capable of quickly and reliably providing the stored data in response to queries may be used, and the computing device may be accessible locally instead of over a network, or may be accessible over some other type of suitable network or provided as a cloud-based service. A data store may also include data stored in an organized manner on a storage medium, as described further below. One of ordinary skill in the art will recognize that separate data stores described herein may be combined into a single data store, and/or a single data store described herein may be separated into multiple data stores, without departing from the scope of the present disclosure.

In some embodiments, a file data store 808 may be used to store the files included in the multi-dimensional file system. In some embodiments, the file data store 808 may include a traditional file system stored on, for example, a computer-readable medium such as a hard drive, flash drive, optical disk, and/or the like. In such embodiments, information organizing the files into the multi-dimensional file system may be encoded in filenames or other metadata stored in association with the files in the traditional file system. In some embodiments, the information organizing the files into the multi-dimensional file system may be stored separately from the file contents. For example, file contents may be stored in uniquely named files in a traditional file system, while metadata information organizing the file contents into the multi-dimensional file system are stored in a separate data store, such as a relational database and/or the like. One of ordinary skill in the art will understand that the file data stores described herein are exemplary only, and that any suitable technique for storing file contents and organizing the files into the multi-dimensional file system may be used without departing from the scope of the present disclosure.

Figure 9A:
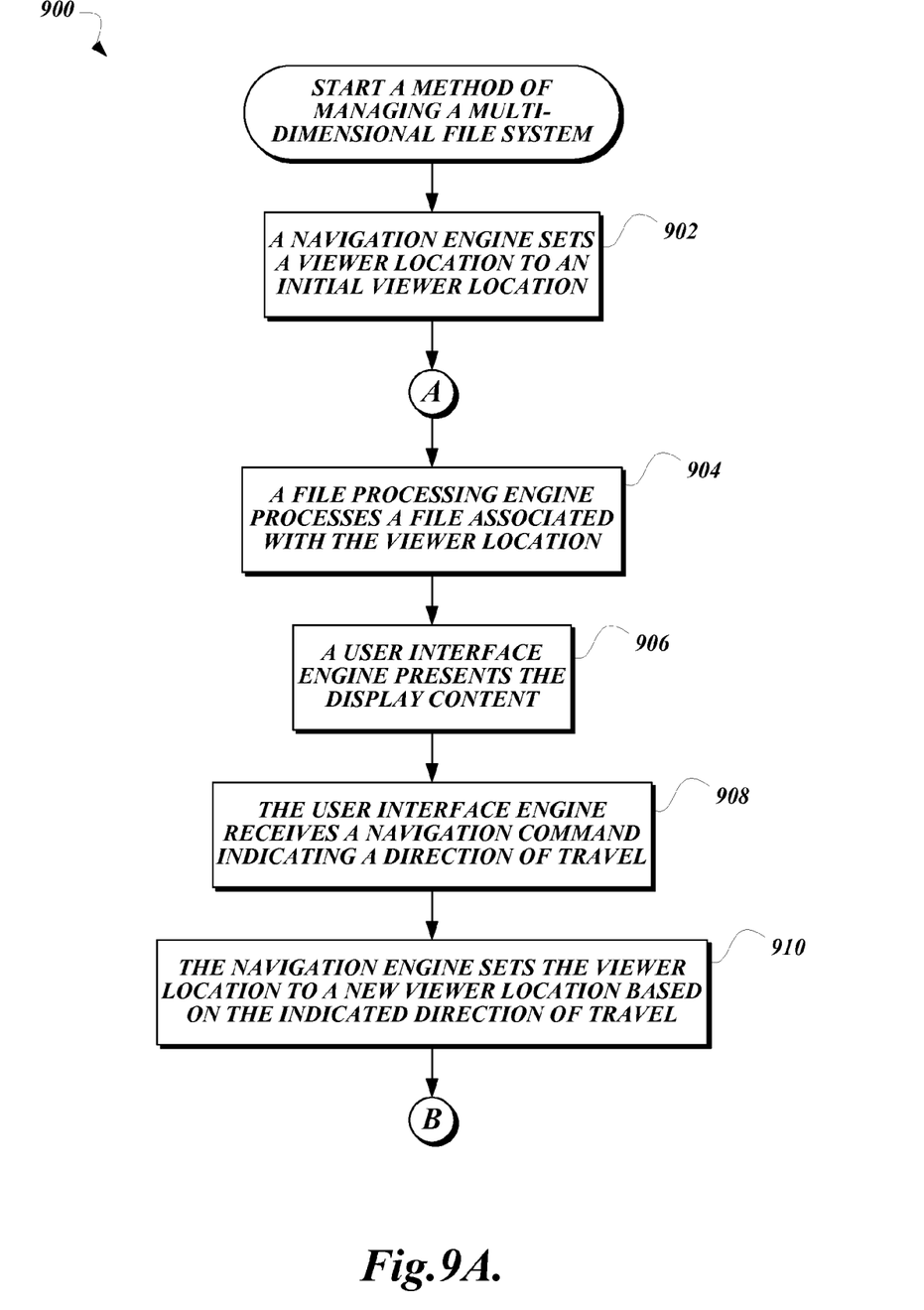
FIGS. 9A-9B illustrate an exemplary embodiment of a method of managing a multi-dimensional file system according to various aspects of the present disclosure.
Figure 9B:
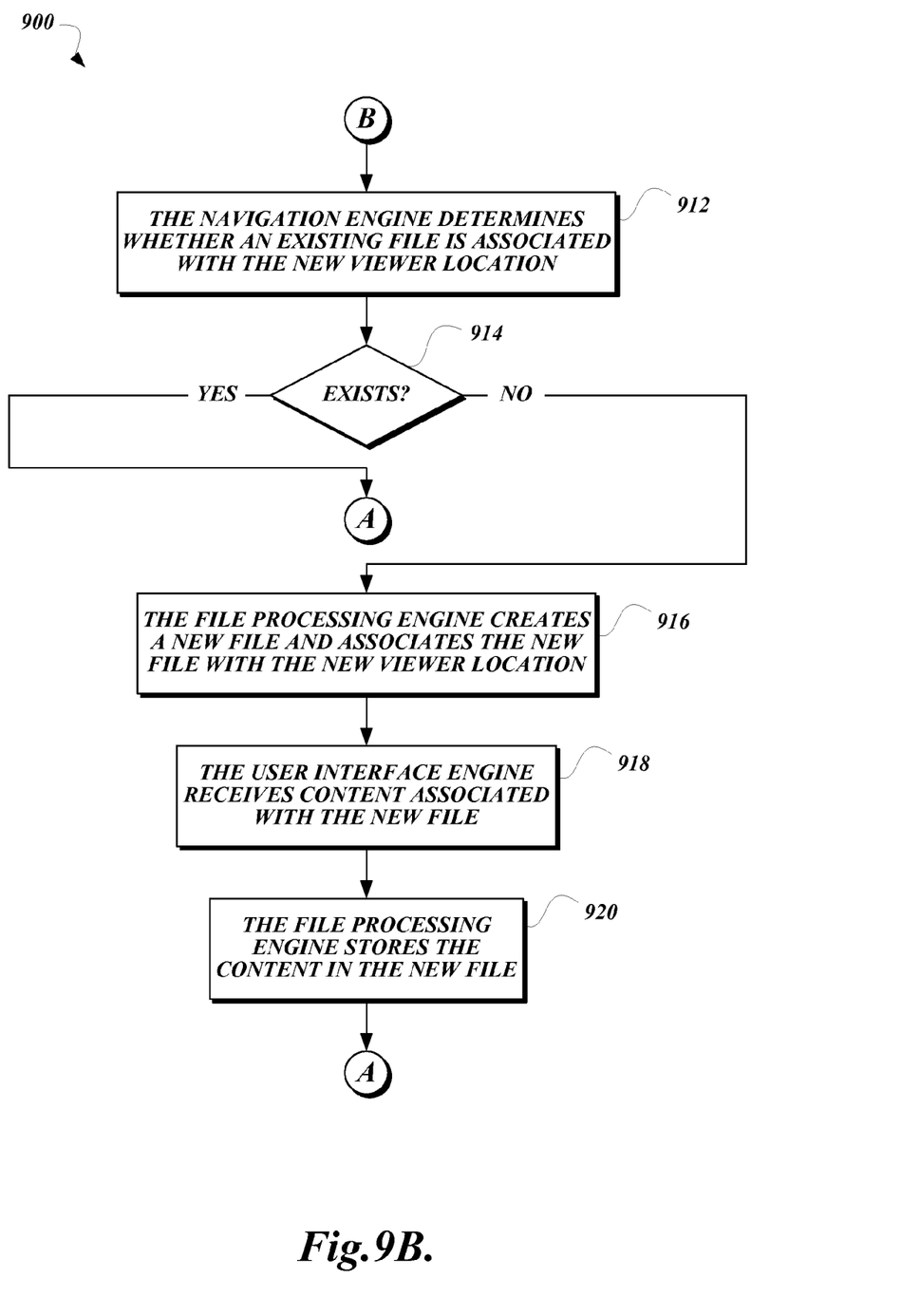

FIGS. 9A-9B illustrate an exemplary embodiment of a method of managing a multi-dimensional file system according to various aspects of the present disclosure. The method 900 primarily relates to a user interacting with files in the multi-dimensional file system, but one of ordinary skill in the art will understand that, in some embodiments, similar activities could be performed automatically, without input from the user, without presenting display information to the user, and/or the like. In some embodiments, the processing performed by the file processing engine 806 may include executing code within the file. In such embodiments, navigating from file to file through the multi-dimensional file system may constitute a thread of execution, and taking a given path through the files may cause a given set of tasks to be executed in an order determined by the path. In some embodiments, the actions performed by the user interface engine 802, such as the actions discussed in block 906 and block 908, may be optional, such as for embodiments wherein no display content is generated and a path through the multi-dimensional file system is traversed without user input.

From a start block, the method 900 proceeds to block 902, where a navigation engine 804 sets a viewer location to an initial viewer location. In some embodiments, this may be, for example, the location of an origin file. However, in some embodiments, the initial viewer location may be configured to be a location other than the origin file. The method 900 proceeds to a continuation terminal ("terminal A"), and then to block 904, where a file processing engine 806 processes a file associated with the viewer location. In some embodiments, the processing performed by the file processing engine 806 may include generating display content associated with the file for presentation to the user.

Next, at block 906, a user interface engine 802 presents the display content to the user. The display content may include the result of processing defined by the file, a description of the file, metadata associated with the file, and/or the like. At block 908, the user interface engine 802 receives a navigation command indicating a direction of travel. For example, in a two-dimensional file system 200 such as the one discussed and illustrated above in association with FIG. 2, a navigation command may be received indicating a direction of north, south, east, or west. In other embodiments, the directions may have different names, and/or may include more or fewer dimensions. Next, at block 910, the navigation engine 804 sets the viewer location to a new viewer location based on the indicated direction of travel. For example, in the two-dimensional file system 200, if the initial viewer location was the origin file, and the navigation command indicated a direction of "north," the navigation engine 804 would set the new viewer location to be one unit north of the origin file. In some embodiments, the navigation command may include a distance to travel in the indicated direction (one or more units). In some embodiments, the navigation command may include multiple directions and/or multiple distances, to indicate a path through the file system. The method 900 then proceeds to a continuation terminal ("terminal B").

From terminal B (FIG. 9B), the method 900 proceeds to block 912, where the navigation engine 804 determines whether an existing file is associated with the new viewer location. For example, if the initial viewer location were the western neighbor file 210 of the two-dimensional file system 200 illustrated in FIG. 2, a new viewer location resulting from a navigation direction of "north" would be associated with an existing file, whereas a new viewer location resulting from a navigation direction of "west" would not be associated with an existing file.

At decision block 914, a test is performed to determine whether the new viewer location is associated with an existing file. If the result of the test at decision block 914 is YES, then the method 900 proceeds to a continuation terminal ("terminal A"). In this case, the method 900 simply returns to terminal A in FIG. 9A, treating the new viewer location as the viewer location and re-executing the subsequent method actions to process the existing file, present display content, receive a navigation command, and so on.

If the result of the test at decision block 914 is NO, then the method 900 proceeds to block 916, where the file processing engine 806 creates a new file and associates the new file with the new viewer location. At block 918, the user interface engine 802 receives content associated with the new file, and at block 920, the file processing engine stores the content in the new file. The method 900 then proceeds to a continuation terminal, which returns the method 900 to terminal A in FIG. 9A, treating the new viewer location as the viewer location and re-executing the subsequent method actions to process the new file, present display content, receive a navigation command, and so on.

In some embodiments, the method 900 may loop indefinitely, may come to an end upon receiving an instruction from the user to quit, may come to an end upon shutdown of the computing device 800, and/or the like.

Figure 10:
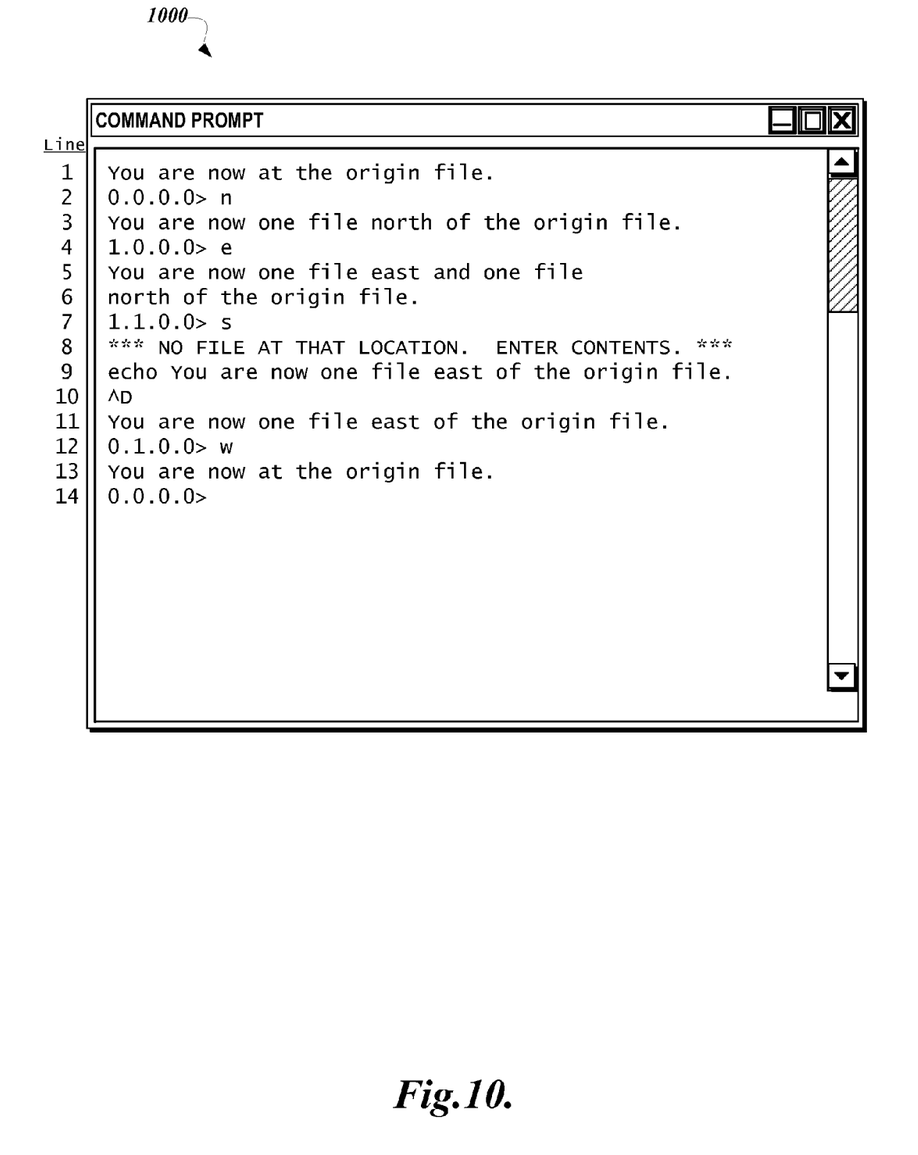
FIG. 10 illustrates an exemplary embodiment of an interaction with a multi-dimensional file system according to various aspects of the present disclosure.

FIG. 10 illustrates an exemplary embodiment of an interaction with a multi-dimensional file system according to various aspects of the present disclosure. In the illustrated embodiment, the user interface engine 802 is providing a command line-style interface 1000, similar to a UNIX shell, a DOS prompt, and/or the like, to a two-dimensional file system similar to the one illustrated and discussed above with respect to FIG. 2. The contents of each file in the illustrated embodiment cause text to be displayed on the command line interface. This functionality is useful for demonstrating the actions of the multi-dimensional file system, but one of ordinary skill in the art will understand that, in some embodiments, more significant functionality could be performed while processing the contents of the files.

Line 1 of the interface 1000 displays the result of processing contents at the initial viewer location. In the illustrated embodiment, the initial viewer location is the origin file. Line 2 of the interface 1000 presents a prompt to the user for input. The prompt displays the file name of the file at the viewer location, which also encodes the viewer location. In the illustrated embodiment, the prompt accepts navigation commands from the user, which may include a direction such as "north," "south," "east," or "west," or an abbreviated direction such as "n," "s," "e," or "w." The prompt may also accept other commands, such as edit commands, exit commands, open commands, or any other command known to one of ordinary skill in the art suitable for use in a command line interface.

At Line 2, the user input is "n," which causes the navigation engine 804 to set the viewer location to a location one unit north of the origin file. Line 3 presents the result of processing content associated with the file at the location one unit north of the origin file, and Line 4 presents an input prompt that indicates the file name at the new location. At Line 4, the user input is "e," which causes the navigation engine 804 to set the viewer location to a location one unit east of the previous location, which is both one unit north of the origin file and one unit east of the origin file. Lines 5 and 6 present the result of processing content associated with the new location, and Line 7 presents another input prompt.

At Line 7, the user input is "s," which, according to the illustrated embodiment, causes the navigation engine 804 to set the viewer location to a location at which there is not yet a file. In some embodiments, attempts to navigate to files that do not exist may not be allowed by the navigation engine 804. In the illustrated embodiment, however, an attempt to navigate to a file that does not yet exist in the multi-dimensional file system causes a new file to be created at the location. Line 8 illustrates a prompt indicating to the user that a new file will be created. In the illustrated embodiment, a command-line text editor such as vi, vim, and/or the like is launched, and the user may input the content of the file directly. In other embodiments, a graphical text editor may be launched, or file contents may be specified in any other suitable way. Lines 9 and 10 in the illustrated interface 1000 show the input of the user into the command line text editor, with Line 9 showing entered text and Line 10 showing an end-of-file control character used to exit the text editor.

Once the file contents are collected, the file contents are processed. Line 11 shows the result of processing the collected content of the new file, and Line 12 presents an input prompt that indicates the location of the new file. At Line 12, the user input is "w," which causes the navigation engine 804 to set the viewer location to the location of the origin file (the user has moved one unit north, one unit east, one unit south, and one unit west, which returns the user to the origin). Line 13 illustrates the result of processing the content of the origin file (similar to Line 1), and Line 14 illustrates another input prompt.

Though embodiments that relate to navigating among files stored in a file system are primarily discussed herein, one of ordinary skill in the art will understand that similar techniques may be used to provide multi-dimensional access to any type of data stored in any type of computer-readable medium. In some embodiments, similar techniques may be used to address locations in a computer-readable medium at a level lower than that of a file system. For example, a multi-dimensional file system or addressing scheme may be used to directly read, write, allocate, and/or otherwise access sectors, blocks, or other fundamental storage locations on a computer-readable storage medium such as a hard drive, a solid-state drive, an optical drive, and/or the like. As another example, a multi-dimensional file system or addressing scheme may be used to directly read, write, allocate, and/or otherwise access locations in random access memory, CPU registers, or any other computer-readable medium. In some embodiments, locations in the computer-readable medium may be directly addressable via multi-dimensional addresses similar to the filenames discussed above. In some embodiments, multi-dimensional addresses may be mapped to a traditional address space in the computer-readable medium via a translation table.

Figure 11:
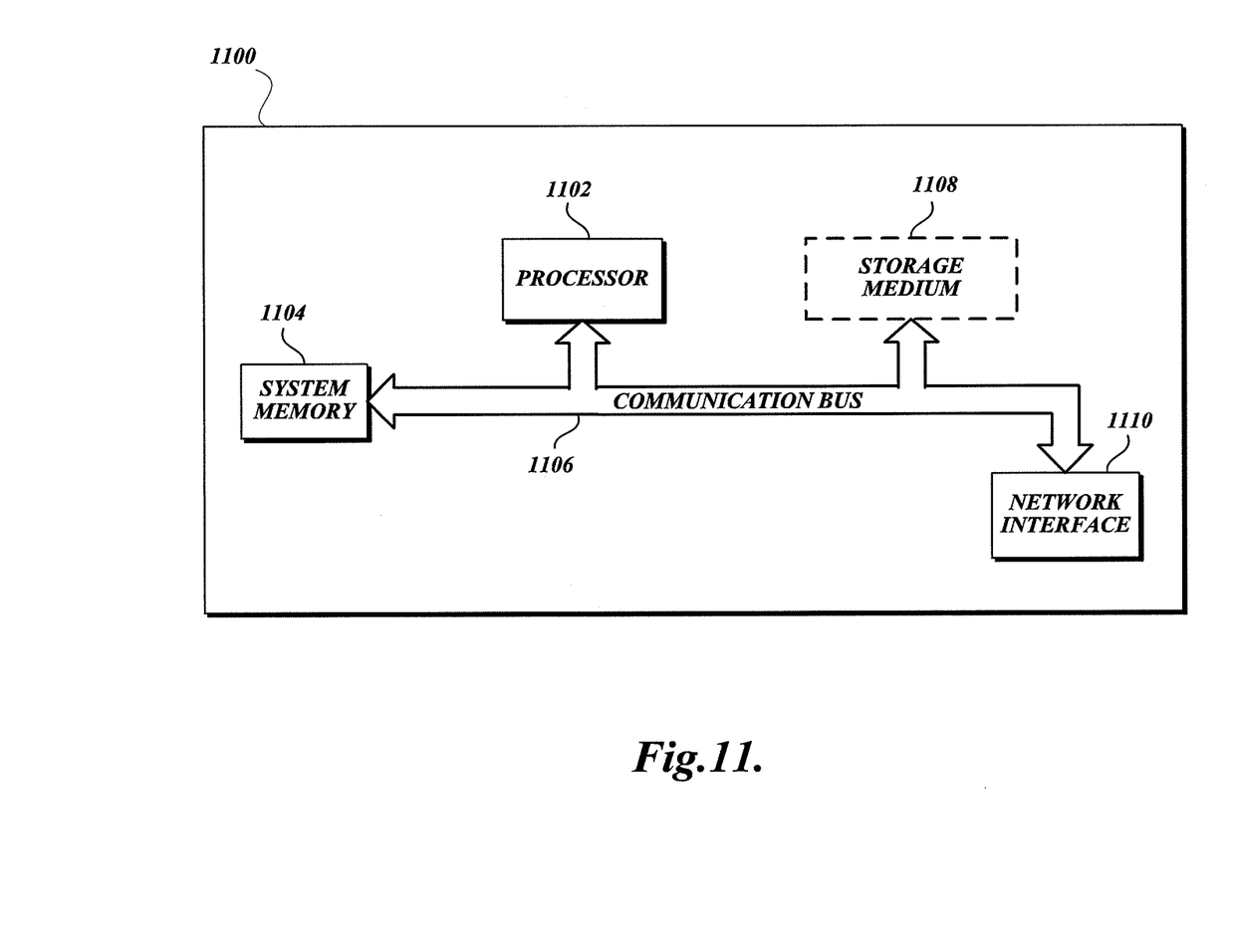
FIG. 11 illustrates aspects of an exemplary computing device appropriate for use with embodiments of the present disclosure.

FIG. 11 illustrates aspects of an exemplary computing device 1100 appropriate for use with embodiments of the present disclosure. While FIG. 11 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 1100 may be any one of any number of currently available or yet to be developed devices.

In its most basic configuration, the computing device 1100 includes at least one processor 1102 and a system memory 1104 connected by a communication bus 1106. Depending on the exact configuration and type of device, the system memory 1104 may be volatile or nonvolatile memory, such as read only memory ("ROM"), random access memory ("RAM"), EEPROM, flash memory, or similar memory technology. Those of ordinary skill in the art and others will recognize that system memory 1104 typically stores data and/or program modules that are immediately accessible to and/or currently being operated on by the processor 1102. In this regard, the processor 1102 may serve as a computational center of the computing device 1100 by supporting the execution of instructions.

As further illustrated in FIG. 11, the computing device 1100 may include a network interface 1110 comprising one or more components for communicating with other devices over a network. Embodiments of the present disclosure may access basic services that utilize the network interface 1110 to perform communications using common network protocols. The network interface 1110 may also include a wireless network interface configured to communicate via one or more wireless communication protocols, such as WiFi, 2G, 3G, LTE, WiMAX, Bluetooth, and/or the like.

In the exemplary embodiment depicted in FIG. 11, the computing device 1100 also includes a storage medium 1108. However, services may be accessed using a computing device that does not include means for persisting data to a local storage medium. Therefore, the storage medium 1108 depicted in FIG. 11 is represented with a dashed line to indicate that the storage medium 1108 is optional. In any event, the storage medium 1108 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 1104 and storage medium 1108 depicted in FIG. 11 are merely examples of computer-readable media.

Suitable implementations of computing devices that include a processor 1102, system memory 1104, communication bus 1106, storage medium 1108, and network interface 1110 are known and commercially available. For ease of illustration and because it is not important for an understanding of the claimed subject matter, FIG. 11 does not show some of the typical components of many computing devices. In this regard, the computing device 1100 may include input devices, such as a keyboard, keypad, mouse, microphone, touch input device, touch screen, tablet, and/or the like. Such input devices may be coupled to the computing device 1100 by wired or wireless connections including RF, infrared, serial, parallel, Bluetooth, USB, or other suitable connections protocols using wireless or physical connections. Similarly, the computing device 1100 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these FIGURES may graphically represent code to be programmed into a computer readable storage medium associated with a computing device.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method of navigating a multi-dimensional file system, the method comprising:
   receiving a navigation command, wherein the navigation command includes a number of units and at least one direction to travel within the multi-dimensional file system on a dimension relative to an origin file location, wherein the multi-dimensional file system comprises multiple two-dimensional file systems stacked upon each other;
   changing a viewer location to a new viewer location based on the navigation command, wherein the new viewer location is designated by a name comprising a plurality of location elements, wherein the plurality of location elements are separated by delimiters, wherein each location element has a value greater than or equal to zero, wherein a location element represents the number of units traveled in a direction within a dimension or between dimensions relevant to the origin file location to arrive at the new location, wherein each possible direction within a dimension is represented by a location element in the name; and
   performing processing based on the new viewer location.

2. The method of claim 1, wherein performing processing based on the new viewer location includes:
   determining that an existing file is associated with the new viewer location; and
   performing processing based on contents of the existing file associated with the new viewer location.

3. The method of claim 2, wherein performing processing based on contents of the existing file comprises causing computer-executable instructions in the contents of the existing file to be executed.

4. The method of claim 2, wherein performing processing based on contents of the existing file comprises presenting a result of the processing to a user.

5. The method of claim 1, wherein performing processing based on the new viewer location includes:
   determining that no files are currently associated with the new viewer location;
   creating a new file; and
   associating the new file with the new viewer location by providing the new file the name that designates the new viewer location.

6. The computer-implemented method of claim 1, wherein the multi-dimensional file system comprises two, three, or four two-dimensional file systems stacked upon each other.

7. The computer-implemented method of claim 1, wherein the direction to travel is north, south, east, west, up, down, or combinations thereof.

8. The computer-implemented method of claim 1, wherein the multi-dimensional file system comprises more than one multi-dimensional file system comprising multiple two-dimensional file systems stacked upon each other.

9. The computer-implemented method of claim 8, wherein the multi-dimensional file system comprises two multi-dimensional file systems comprising multiple two-dimensional file systems stacked upon each other.

10. The computer-implemented method of claim 8, wherein the direction to travel is north, south, east, west, up, down, in, out, or combinations thereof.

11. The computer-implemented method of claim 8, wherein each of the multi-dimensional file systems comprises two, three, or four two-dimensional file systems stacked upon each other.

12. The computer-implemented method of claim 1, wherein the name further comprises a file extension.

13. The computer-implemented method of claim 1, wherein the delimiters are periods.

14. A computer-readable medium having computer-executable instructions stored thereon that, in response to execution by one or more processors of a computing device, cause the computing device to:
   receive a navigation command, wherein the navigation command includes a number of units and at least one direction to travel within a multi-dimensional file system on a dimension relative to an origin file location, wherein the multi-dimensional file system comprises multiple two-dimensional file systems stacked upon each other;
   changing a viewer location to a new viewer location based on the navigation command, wherein the new viewer location is designated by a name comprising a plurality of location elements, wherein the plurality of location elements are separated by delimiters, wherein each location element has a value greater than or equal to zero, wherein a location element represents the number of units traveled in a direction within a dimension or between dimensions relevant to the origin file location to arrive at the new location, wherein each possible direction within a dimension is represented by a location element in the name; and
   perform processing based on the new viewer location.

15. The computer-readable medium of claim 14, wherein performing processing based on the new viewer location includes:
   determining that an existing file is associated with the new viewer location; and
   performing processing based on contents of the existing file associated with the new viewer location.

16. The computer-readable medium of claim 15, wherein performing processing based on contents of the existing file comprises causing computer-executable instructions in the contents of the existing file to be executed.

17. The computer-readable medium of claim 15, wherein performing processing based on contents of the existing file comprises presenting a result of the processing to a user.

18. The computer-readable medium of claim 14, wherein the name further comprises a file extension.

19. The computer-readable medium of claim 14, wherein the delimiters are periods.

20. The computer-readable medium of claim 14, wherein performing processing based on the new viewer location includes:
   determining that no files are currently associated with the new viewer location;
   creating a new file; and
   associating the new file with the new viewer location by providing the new file the name that designates the new viewer location.

21. A computing device configured to provide multi-dimensional access to locations in a computer-readable storage medium, the computing device comprising:
   at least one processor; and
   a computer-readable medium having computer-executable instructions stored thereon that, in response to execution by the at least one processor, cause the computing device to:

receive a navigation command, wherein the navigation command includes a number of units and at least one direction to travel within a multi-dimensional file system on a dimension relative to an origin file location, wherein the multi-dimensional file system comprises multiple two-dimensional file systems stacked upon each other;

changing a viewer location to a new viewer location based on the navigation command, wherein the new viewer location is designated by a name comprising a plurality of elements, wherein the plurality of location elements are separated by delimiters, wherein each location element has a value greater than or equal to zero, wherein a location element represents the number of units traveled in a direction within a dimension or between dimensions relevant to the origin file location to arrive at the new location, wherein each possible direction within a dimension is represented by a location element in the name; and perform processing based on the new viewer location.

22. The computing device of claim 21, wherein performing processing based on the new viewer location includes:

determining that a location in the computer-readable storage medium associated with the new viewer location has previously been allocated; and performing processing based on data stored at the location associated with the new viewer location.

23. The computing device of claim 22, wherein performing processing based on data stored at the location comprises causing computer-executable instructions stored at the location to be executed.

24. The computing device of claim 22, wherein performing processing based on data stored at the location comprises presenting a result of the processing to a user.

25. The computing device of claim 22, wherein the location in the computer-readable storage medium is a file in a file system.

26. The computing device of claim 22, wherein the location in the computer-readable storage medium is a sector, a block, or a random access memory address.

27. The computing device of claim 21, wherein the name further comprises a file extension.

28. The computing device of claim 21, wherein the delimiters are periods.

* * * * *